United States Patent [19]
Johnson

[11] 3,765,054
[45] Oct. 16, 1973

[54] FRICTIONAL CONNECTING DEVICES
[75] Inventor: Maurice Vivian Johnson, Quinton, Birmingham, The County of Warwick, England
[73] Assignee: Wall & Leigh Thermoplastics Limited, Stafford, England
[22] Filed: June 2, 1971
[21] Appl. No.: 149,182

[52] U.S. Cl. ................................................ 16/140
[51] Int. Cl. ............................................. E05d 11/08
[58] Field of Search ............................ 16/140, 142; 296/97 K

[56] References Cited
FOREIGN PATENTS OR APPLICATIONS
1,295,506  3/1962  France .................................. 16/140

Primary Examiner—James T. McCall
Assistant Examiner—Doris L. Troutman
Attorney—Freidman & Goodman

[57] ABSTRACT

A frictional connecting device in which a first member has a spigot movably mounted on it and is in snap fit engagement with a second member which frictionally engages the spigot to resist movement of the spigot relative to the second member and hence relative to the first member. In the described embodiment the first member forms part of a sun visor for a motor vehicle.

8 Claims, 6 Drawing Figures

Patented Oct. 16, 1973 3,765,054

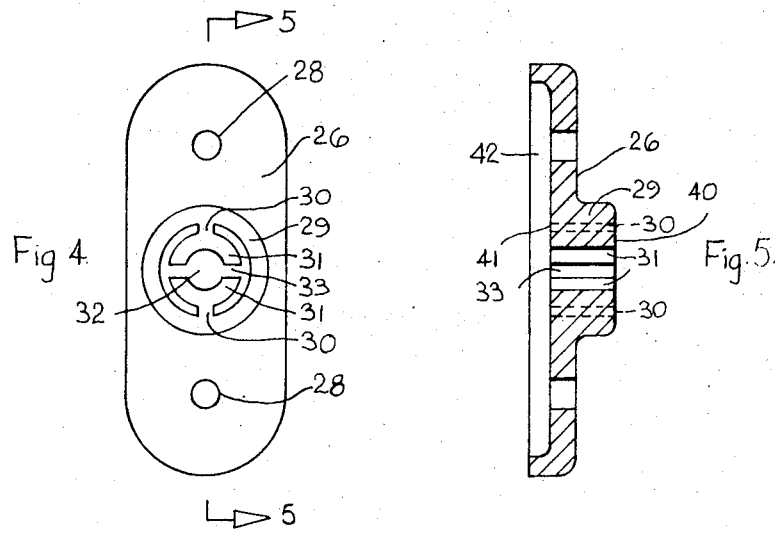
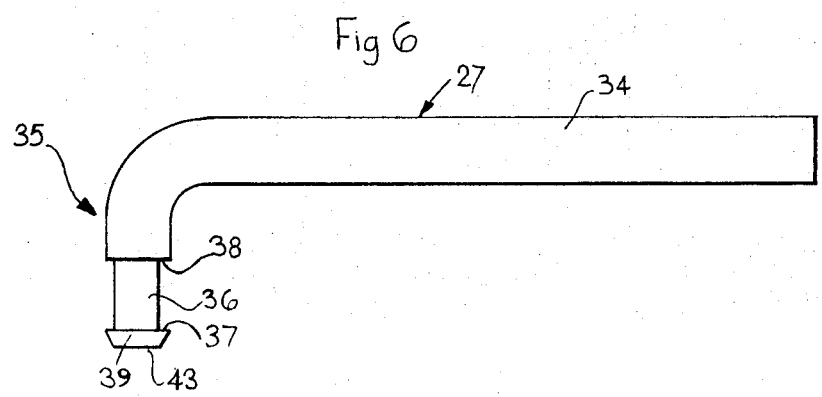

3,765,054

FRICTIONAL CONNECTING DEVICES

BACKGROUND OF THE INVENTION

Field of the Invention

This invention relates to frictional connecting devices.

The invention has been developed primarily in relation to a sun visor assembly for a motor vehicle but it can be used in other applications such as stands for laboratory apparatus, movable parts of toys, and display stands.

SUMMARY OF THE INVENTION

It is an object of the invention to provide a new and improved frictional connecting device. According to one aspect of the invention we provide a frictional connecting device comprising a spigot, a first member including a portion engaged with the spigot to mount the first member on the spigot for rotation relative thereto, and a second member comprising a tubular portion to receive a part of the spigot, and a longitudinal flange extending transversely therefrom and provided with means to snap-engage with the first member, the tubular portion comprising two parts, one part having a longitudinally extending slit formed in the wall thereof adjacent one face of the flange, and the other part having a longitudinally extending slit formed in the wall thereof adjacent the other face of the flange to provide a frictional grip on the part of the spigot received within the tubular portion and to restrain relative rotation between the first member and the spigot in either direction.

The second member is preferably moulded from a resiliently elastically deformable material having suitable frictional characteristics relative to the material of the spigot. Tests have shown polyacetal resin to be a suitable material for the second member when used with a steel spigot.

BRIEF DESCRIPTION OF THE DRAWINGS

The invention will now be described by way of example with reference to the accompanying drawings, wherein:

FIG. 4 is a plan view of a mounting plate for a mounting arrangement according to the second aspect of the invention;

FIG. 5 is a sectional view of the mounting plate of FIG. 4; and

FIG. 6 is a view of a spigot to be used with the mounting plate of FIG. 4.

DESCRIPTION OF THE PREFERRED EMBODIMENTS

Figure 1:
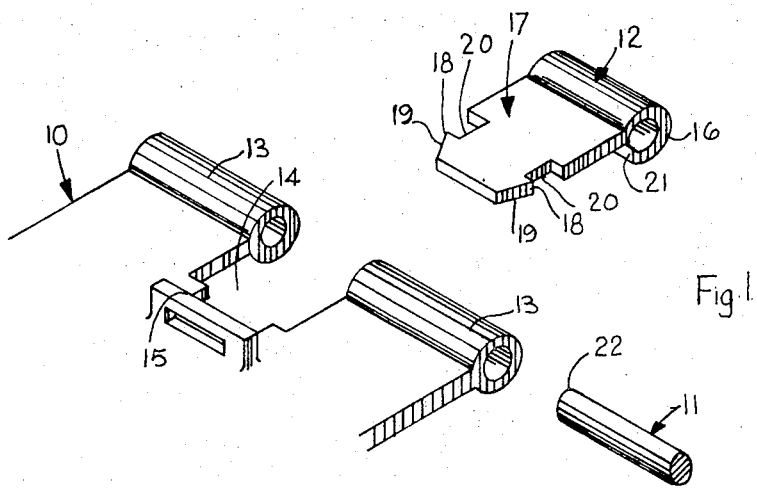
FIG. 1 is an exploded perspective view of an assembly including one form of a connecting device according to the first aspect of the invention.

FIG. 1 of the drawings shows a motor vehicle sun visor assembly consisting of a generally plate-like visor frame 10, a rectilinear rod 11 and a friction clutch element 12. The visor frame 10, rod 11 and friction clutch element 12 comprise respectively the first member, locating spigot and second member of a connecting device embodying the first aspect of the present invention. The rod 11 constituting the spigot is secured at one end thereof to any convenient part of the vehicle, not shown, so that its axis is substantially horizontal. The rod 11 would normally be secured at or adjacent the junction between a windscreen pillar and the roof of the vehicle.

The visor frame is provided along one edge thereof with two tubes 13 which receive the rod 11. The frame is then free to pivot about the rod. The frame is further provided with a generally rectangular cut-out 14 and an upstanding portion 15 in the form of a square-sided bridge which spans the cut-out adjacent its inner end.

The clutch element 12 is moulded from a polyacetal resin and consists of a tubular portion 16 formed with a longitudinally extending gap 21 and a generally rectangular longitudinal flange 17 extending therefrom along one edge of the gap 21. The flange is provided adjacent one end thereof with transversely extending projections 18 which snap into the bridge portion 15 to secure the clutch to the frame. The forward ends of the projections are provided with chamfers 19 to facilitate the insertion of the end of the flange, and there are recesses 20 in the flange to locate the clutch element within the bridge portion.

As the flange is inserted into the bridge portion, the tubular vehicle is snapped over that part of the rod 11 which lies between the tubes 13. The longitudinally extending gap 21 in the tubular portion 16 is expanded to accommodate the rod 11 and as the clutch element is pushed into place it snaps over the rod 11 so that the rod is gripped within the tubular portion 16.

Alternatively, the clutch element may be snapped into place on the visor frame before the frame is located on the rod 11, the rod being subsequently pushed through the tubes 13 and the tubular portion 16, an end 22 of the rod being rounded or chamfered to facilitate its entry. This alternative assembly is advantageous in allowing the visor and the clutch element to be upholstered as one unit, the clutch element being retained in position on the visor as described above.

The assembled unit comprises a sun visor which is pivotally movable on a spigot but which will not move unless a force sufficient to overcome the friction between the clutch element and the spigot is overcome, the fit between the clutch element and the spigot and their respectve materials being selected so that the visor will not move under such vibrational forces as it would normally encounter in use.

When the clutch element of FIG. 1 is rotated about the spigot, the tubular portion 16 will tend either to open or to close according to the direction of rotation. This will vary the fit of the tubular portion on the spigot, and a greater force will be required to rotate the clutch element in that direction of rotation which causes the tubular portion to close than in the direction which causes the tubular portion to open.

Figure 2:
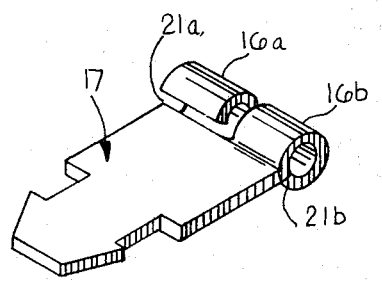
FIG. 2 is a perspective view of an alternative second member to be used with the assembly shown in FIG. 1.

FIG. 2 shows a form of clutch element which requires substantially the same force to induce rotation in either direction. In this case, the tubular portion is divided into two equal sections 16a and 16b, wih gaps 21a and 21b provided respectively adjacent opposite faces of the flange 17. According to the direction of rotation, one tubular section will tend to open and the other will tend to close, and thus the force required to rotate the clutch element about the spigot will be substantially the same in each direction of rotation.

Figure 3:
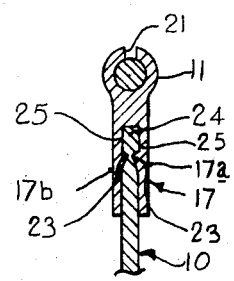
FIG. 3 is a sectional view of an alternative assembly.

FIG. 3 shows an alternative method of effecting this result wherein the gap 21 is provided diametrically opposite the flange portion 17 so that according to the direction of rotation one part of the tube will tend to close the other will tend to open.

In FIG. 3 the flange portion is divided into two parallel parts 17a and 17b. The inner faces of these parallel parts are provided with upstanding projections 23 which are snapped over the end portion 24 of the visor frame 10 to be received in recesses 25 to secure the clutch element to the frame.

FIGS. 4 to 6 of the drawings show a mounting arrangement for a sun visor assembly embodying the second aspect of the invention. The mounting arrangement comprises a mounting plate 26 and a spigot 27. The mounting plate 26 is provided with holes 28 for securing the plate to the body of a motor vehicle by screws, not shown.

The mounting plate is further provided with an upstanding annular projection 29. Extending inwardly from the annular projection are two diametrically opposed webs 30, each of which carries a semi-annular gripping portion 31. The inner faces of the gripping portions 31 define a cylindrical bore 32, and the opposed edges of the gripping portions define gaps 33 which permit radial deformation of the bore.

The spigot 27 comprises a first portion 34 adapted to be received within a tubular portion of a sun visor as described above with reference to FIGS. 1 to 3, and a second portion 35 arranged at right angles to said first portion. The second portion includes a portion 36 of reduced cross-section extending between two opposed shoulders 37 and 38.

For assembly, a tapered end 39 of the spigot is inserted into the bore 32 of the mounting plate and the gripping portions 31 snap over the end 39 to grip the reduced portion 36, the normal, undeformed diameter of the bore 32 being less than that of the reduced portion 36 so that the gripping portions 31 are caused to grip the reduced portion, said grip giving the required frictional characteristics.

The mounting plate is moulded from a polyacetal resin which gives a grip of the required frictional characteristic with a steel spigot. If desired, only the gripping portions 31 may be made in the polyacetal resin and the remainder of the mounting plate may be made in some other material.

The distance between the opposed shoulders 37 and 38 is substantially euqal to the distance between the end faces 40 and 41 of the gripping portion 31 so that when inserted into the bore the spigot is posivitely located.

The vehicle body may be provided with a suitably positioned hole to give clearance for the end 39 of the spigot when the visor assembly is secured in position, but in the preferred form the underface of the mounting plate is relieved as indicated at 42 by an amount sufficient to ensure that the end of the spigot is clear of the vehicle body when the mounting plate is secured thereto.

With the mounting arrangement assembled as described above, the spigot portion 34 is pivotally movable about the mounting plate 26. Hence, with the mounting plate suitably positioned in a motor vehicle, a sun visor attached to the spigot can be used to shield against light entering through the windscreen of the vehicle, and by pivotally moving the visor spigot through approximately 90° the visor can be arranged to shield against light entering through the adjacent side window. The frictional grip exerted on the spigot allows it to be retained in any desired position.

The mounting arrangement described with reference to FIGS. 4 to 6 may be used in a sun visor assembly including a frictional connector as described with rference to FIGS. 1 to 3 or may be used in any other application requiring the described characteristics.

I claim:

1. A frictional connecting device comprising a spigot, a first member including a portion engaged with the spigot to mount the first member on the spigot for rotation relative thereto, and a second member comprising a tubular portion to receive a part of the spigot, and a longitudinal flange extending transversely therefrom and provided with means to snap-engage with the first member, the tubular portion comprising two parts, one part having a longitudinally extending slit formed in the wall thereof adjacent one face of the flange, and the other part having a longitudinally extending slit formed in the wall thereof adjacent the other face of the flange to provide a frictional grip on the part of the spigot received within the tubular portion and to restrain relative rotation between the first member and the spigot in either direction 2. A connecting device according to claim 1, wherein the second member is made from a resiliently elastically deformable material having frictional characteristics relative to the material of the spigot, whereby, in use, said frictional grip is exerted on said part of the spigot.

3. A connecting device according to claim 1 wherein the spigot is carried in a mounting arrangement which includes a mounting plate having means defining a bore within which a portion of the spigot is received so that the spigot is capable of rotation within the bore and the bore exerts a frictional grip on the portion of the spigot within the bore to restrain the spigot against rotation relative to the mounting plate.

4. A connecting device according to claim 3, wherein the portion defining the bore is formed of a resiliently deformable synthetic plastics material having frictional characteristics relative to the material of the spigot so as to exert the frictional grip on the spigot.

5. A connecting device according to claim 3, wherein the spigot includes a portion of reduced diameter bounded by opposed shoulders, the reduced diameter portion being received in the bore and the opposed shoulders engaging with surfaces of the mounting plate to prevent movement of the spigot longitudinally of the bore.

6. A connecting device according to claim 3, wherein the bore is defined by a plurality of part-annular portions separated by gaps extending longitudinally of the bore, and each part-annular portion being connected to the mounting plate through a web portion.

7. A connecting device according to claim 1 wherein the flange is provided with projections which snap into appropriately formed recesses in the first member.

8. A connecting device acording to claim 7 wherein the projections extend transversely from the flange in a longitudinal direction relative to the tube.

* * * * *